United States Patent [19]

Christel, Jr. et al.

[11] Patent Number: 4,832,711
[45] Date of Patent: May 23, 1989

[54] ADSORBENT FRACTIONATOR WITH AUTOMATIC TEMPERATURE-SENSING CYCLE CONTROL AND PROCESS

[75] Inventors: Conrad Christel, Jr., Dryden; Donald H. White, Jr., Homer, both of N.Y.

[73] Assignee: Pall Corporation, Glen Cove, N.Y.

[21] Appl. No.: 581,758

[22] Filed: Feb. 21, 1984

Related U.S. Application Data

[63] Continuation of Ser. No. 352,508, Feb. 25, 1982, abandoned.

[51] Int. Cl.$^4$ .............................................. B01D 53/04
[52] U.S. Cl. ........................................ 55/20; 55/33;
   55/58; 55/62; 55/74; 55/163; 55/179; 55/208;
   55/213; 55/387
[58] Field of Search ................... 55/18, 20, 21, 33, 58,
   55/62, 68, 74, 75, 161, 163, 179, 180, 208, 213,
   387, 389

[56] References Cited

U.S. PATENT DOCUMENTS

| | | | |
|---|---|---|---|
| 2,328,521 | 8/1943 | Wittmann | 55/163 |
| 2,561,441 | 7/1951 | Lou | 55/163 |
| 2,562,334 | 7/1951 | Roberts | 55/179 X |
| 2,630,876 | 3/1953 | Kehde | 55/20 |
| 2,919,764 | 1/1960 | Dillman et al. | 55/163 |
| 3,513,631 | 5/1970 | Seibert et al. | 55/33 |
| 4,023,940 | 5/1977 | Schultz | 55/163 |
| 4,197,095 | 4/1980 | White, Jr. et al. | 55/20 |
| 4,218,224 | 8/1980 | Sun | 55/20 |
| 4,312,641 | 1/1982 | Verrando et al. | 55/33 |
| 4,322,223 | 3/1982 | Christel, Jr. | 55/18 |
| 4,324,564 | 4/1982 | Oliker | 55/20 |
| 4,351,649 | 9/1982 | Owens et al. | 55/163 X |

FOREIGN PATENT DOCUMENTS

129520  1/1978  German Democratic Rep. .... 55/20

Primary Examiner—Robert Spitzer

[57] ABSTRACT

A method and apparatus are provided for adsorbing water vapor or other first gas from a mixture thereof with a second gas to reduce the water vapor or first gas concentration in the mixture to below a permissible maximum concentration, in which the advance of the leading edge of the adsorption front in a sorbent bed is detected by sensing the advance of the temperature front that precedes the adsorption front, and this advance is detected by sensing the temperature of the sorbent bed sufficiently far from the end of the bed to prevent the temperature front from leaving the bed, using a temperature sampling probe, when the temperature front reaches this point, the adsorption front is still a distance away, since it follows the temperature front, and the absorption cycle is discontinued, and the bed regenerated; the regeneration cycle can similarly be controlled independently, to be terminated when regeneration is complete, as detected by advance of the temperature front in the opposite direction.

14 Claims, 7 Drawing Sheets

ADSORBENT FRACTIONATOR WITH AUTOMATIC TEMPERATURE-SENSING CYCLE CONTROL AND PROCESS

This is a continuation of application Ser. No. 352,508, filed Feb. 25, 1982, now abandoned.

Desiccant dryers have been marketed for many years and are in wide use throughout the world. The usual type is made up of two desiccant beds, one of which is being regenerated while the other is on the drying cycle. The gas to be dried is passed through the one desiccant bed in one direction in the drying cycle, and then, at a predetermined time interval, when the desiccant can be expected to have adsorbed so much moisture that there is a danger that the required low moisture level of the effluent gas will not be met, the influent gas is switched to the other bed, and the spent bed is regenerated by heating and/or by evacuation and/or by passing purge effluent gas therethrough, usually in counterflow.

Desiccant dryers on the market today are of two general types, a heat-reactivatable type, in which heat is applied to regenerate the spent desiccant at the conclusion of the drying cycle, and a heatless dryer, in which heat is not applied to regenerate the spent desiccant at the conclusion of the drying cycle, but which relies upon the use of a purge flow of dry gas, usually effluent gas from the bed on the drying cycle, which is passed through the spent bed at a lower pressure, with rapid cycling to conserve the heat of adsorption to aid in the regeneration of the spent bed. The use of a purge gas to regenerate at a lower pressure than the line pressure of the gas being dried is not, however, confined to a heatless dryer, but was used in heat-reactivated desiccant dryers for many years before the advent of the heatless type.

Both types of dryers are operated with fixed time drying and regenerating cycles, usually equal in duration, with the length of the cycles being fixed according to the volume of desiccant available and the moisture content of the influent air. The time of the cycle is invariably fixed at much less time than might be permitted, in order to ensure that the moisture content of the effluent gas will always meet the system requirements. As the drying cycle proceeds, the desiccant bed becomes progressively more and more saturated from the inlet end towards the outlet end, and less and less capable of adsorbing moisture that is carried through it by the influent gas. Removal of moisture from the influent gas depends upon the rate of flow of the gas and the rate of moisture adsorption and moisture content of the adsorbent, as well as the temperature and pressure of gas within the bed. The rate of adsorption by the desiccant may decrease as the desiccant becomes loaded. Since the moisture content of an influent gas is rarely constant, the demand put upon the desiccant bed can vary, sometimes rather rapidly, and sometimes within rather wide limits. Consequently, a fixed time drying cycle must always be short enough to give a safe margin for moisture removal for maximum moisture content of the influent gas, and this means that frequently a fixed time cycle must be rather short, to be sure it is ended before the available remaining moisture capacity of the bed reaches too low a level. This means, of course, that in the average cycle the moisture capacity of the bed may not be well utilized.

The life a desiccant that is heated in order to regenerate it is to a considerable extent dependent upon the frequency of regeneration. It is a rule of thumb in the trade that a desiccant bed is good for a certain number of regenerations, and no more. Obviously, then, the effective life of a bed is shorted unnecessarily, whenever during each drying cycle the moisture capacity is not effectively utilized. Furthermore, the inability to achieve a full utilization of the effective bed capacity during each drying cycle, both in the case of heat-reactivated and heatless dryers, means that the volume of the desiccant bed must be more than what might be required, to provide the reserve capacity needed to adsorb extreme but occasional moisture levels of the influent gas during the fixed time period of the drying cycle.

Inefficient utilization of moisture capacity also leads to a considerable waste of purge gas with each cyle. Purge gas is normally bled off from the effluent gas, for the purpose of regeneration of a spent bed, and correspondingly reduces the yield of effluent. Each time a bed is transferred from the drying cycle to the regenerating cycle, a volume of purge gas equal to the open volume of the bed vessel is necessarily dumped, and lost. Short cycling means higher purge losses than long cycling.

Such losses are particularly severe in the case of heatless dryers, which require much more frequent cycling. Indeed, the choice between a heat-regenerated and a heatless dryer frequently is dictated by the frequency of recycling required. Skarstrom in U.S. Pat. No. 2,944,627, dated July 12, 1960, describes a type of heatless dryer which purports to represent an improvement on those described some years earlier by Wynkoop, U.S. Pat. No. 2,800,197, dated July 23, 1957, and in British Pat. Nos. 633,137 and 677,150. Skarstrom showed that by very rapid cycling between adsorption and desorption in the respective zones, the desorption cylce could effectively utilize the heat of adsorption for regeneration of spent desiccant. Skarstrom accordingly taught the use of times in the adsorption cycle not exceeding two or three minutes, preferably less than one minute, and very desirably less than twenty seconds. Such cycling times are of course shorter than Wynkoop's which was of the order of thirty minutes or higher, as shown in the graph of FIG. 2, or the cycling times ranging from five minutes to thirty minutes, of British Pat. No. 633,137. British Pat. No. 677,150 demonstrated that the adsorption and desorption cycles need not necessarily be equal.

The drawback of the Skarstrom system, however, is the very considerable volume of purge gas lost with each cycle, and this loss is very much greater at a cycling time of, for instance, ten seconds, as compared to the British Patents' five to thirty minutes, and Wynkoop's thirty minutes or longer. In the short Skarstrom cycles, of course, the capacity of the desiccant bed is very little utilized, but when no heat is applied to effect regeneration of the desiccant, it becomes more important to conserve heat liberated in the bed on adsorption so that it remains in the bed, for utilization in the regeneration, or it will be impossible effectively to regenerate the adsorbent on the regeneration cycle.

Dryers have been provided with moisture detectors in the effluent line, to measure dewpoints in the effluent gas. Because of their slow response and relative insensitivity to low dewpoints, however, such devices have not been and cannot be used to determine the cycling of a dryer when an effluent of low dewpoint or relative humidity is desired, since by the time the detector has sensed moisture in the effluent, the front has broken through the bed.

In accordance with the invention of U.S. Pat. No. 3,448,516, patented June 10, 1969, to Seibert and Verrando, a process and apparatus for drying gases are provided which make it possible effectively to utilize the moisture capacity of desiccant bed, by providing for regeneration thereof only when the moisture load on the bed requires it, and thus obtain optimum efficiency in use. During each adsorption cycle, the sorbent can be brought to the limiting moisture capacity at which regeneration can be effected under the available regenerating conditions, whether these be with or without the application of heat, and with or without the application of a reduced pressure. This is made possible in accordance with the invention by detecting the advance of the moisture front within the bed, as evidenced by the moisture content of the gas being dried, and halting the drying cycle whenever the front has reached a predetermined point in the bed, short of breaking out of the bed. This can be done automatically by providing in the desiccant bed means for sensing the moisture content of the gas being dried, and means responsive to moisture content to halt the drying cycle whenever a predetermined moisture content in the gas being dried is reached at that point.

The advance of the moisture front in a bed of desiccant as it gradually adsorbs moisture is a well known phenomenon in the desiccant drying art, and is discussed in numerous patents, for example, Skarstrom, U.S. Pat. No. 2,944,627. During the greater part of the drying cycle, the sorbent efficiently sorbs moisture from gas passing over it. When the sorbent capacity of the desiccant approaches zero, however, the moisture content of gas passed over it rises sharply. If moisture content, dewpoint or relative humidity of the gas be measured, and plotted against time, this usually sudden rise in moisture content is noted as a change in slope, and the increasing moisture content then rapidly approaches the moisture content of the influent gas. The resulting S-shaped portion of this curve in effect represents the moisture front, and if this be observed in terms of the length of the bed, it will be found to progress from the influent end to the effluent end of the bed as the adsorption cycle proceeds. The objective is to conclude the cycle before the front or change in slope of the curve reaches the end of the bed, since thereafter the rise is so rapid that delivery of undesirably moist effluent can hardly be prevented.

In accordance with the Seibert et al invention, this is prevented by detecting the advance of the front at a point in the bed sufficiently spaced from the effluent end to permit terminating the drying cycle before the front reaches the effluent end. How this is done is best seen in reference to FIGS. 1 or 8 of U.S. Pat. No. 3,448,561.

Figure 1:
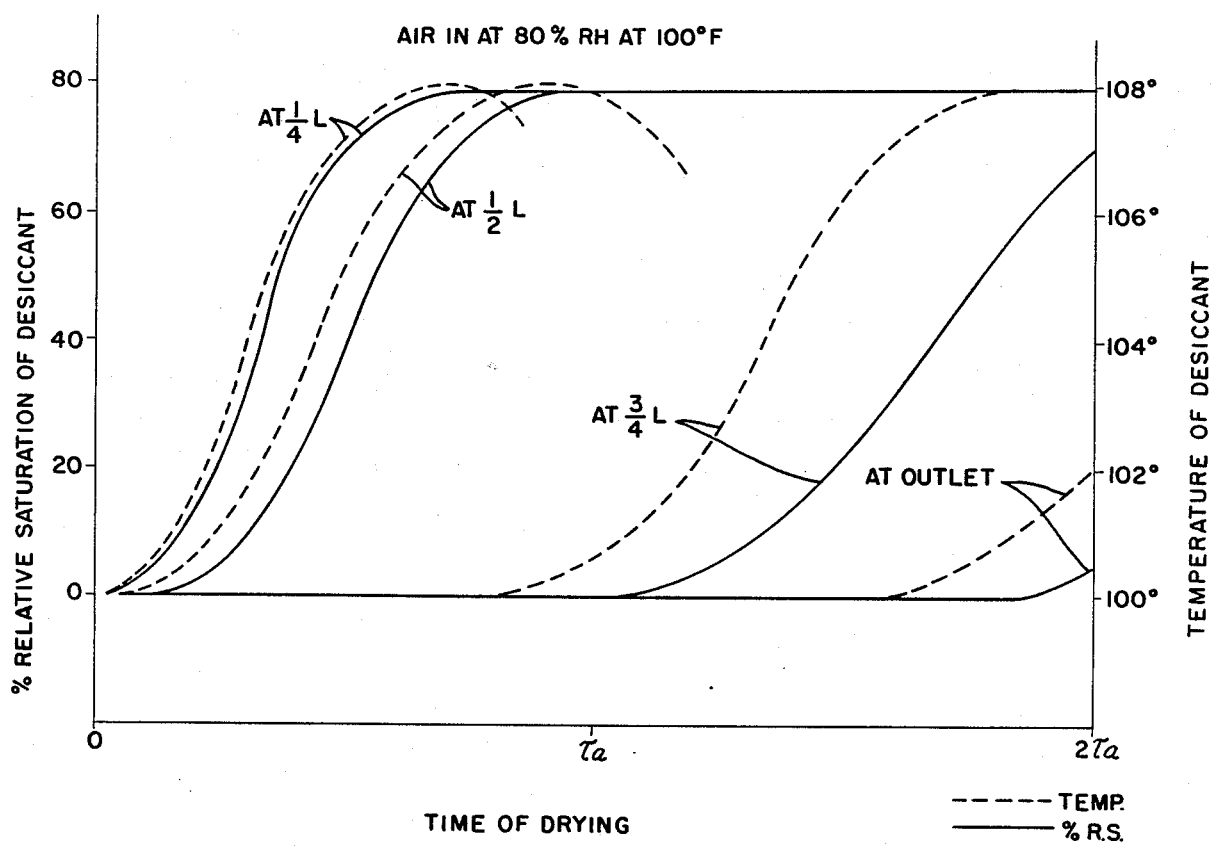
FIG. 1 represents a series of curves for the drying of moist gas at 90% relative humidity at temperatures ranging from 100° F. to 70° F., plotting the dewpoint against time to gas being dried, detected at a series of points X 12 inches in from the effluent end of the bed, at a series of points Y 6 inches from the effluent end of the bed, and at the outlet from the bed.
Figure 8:
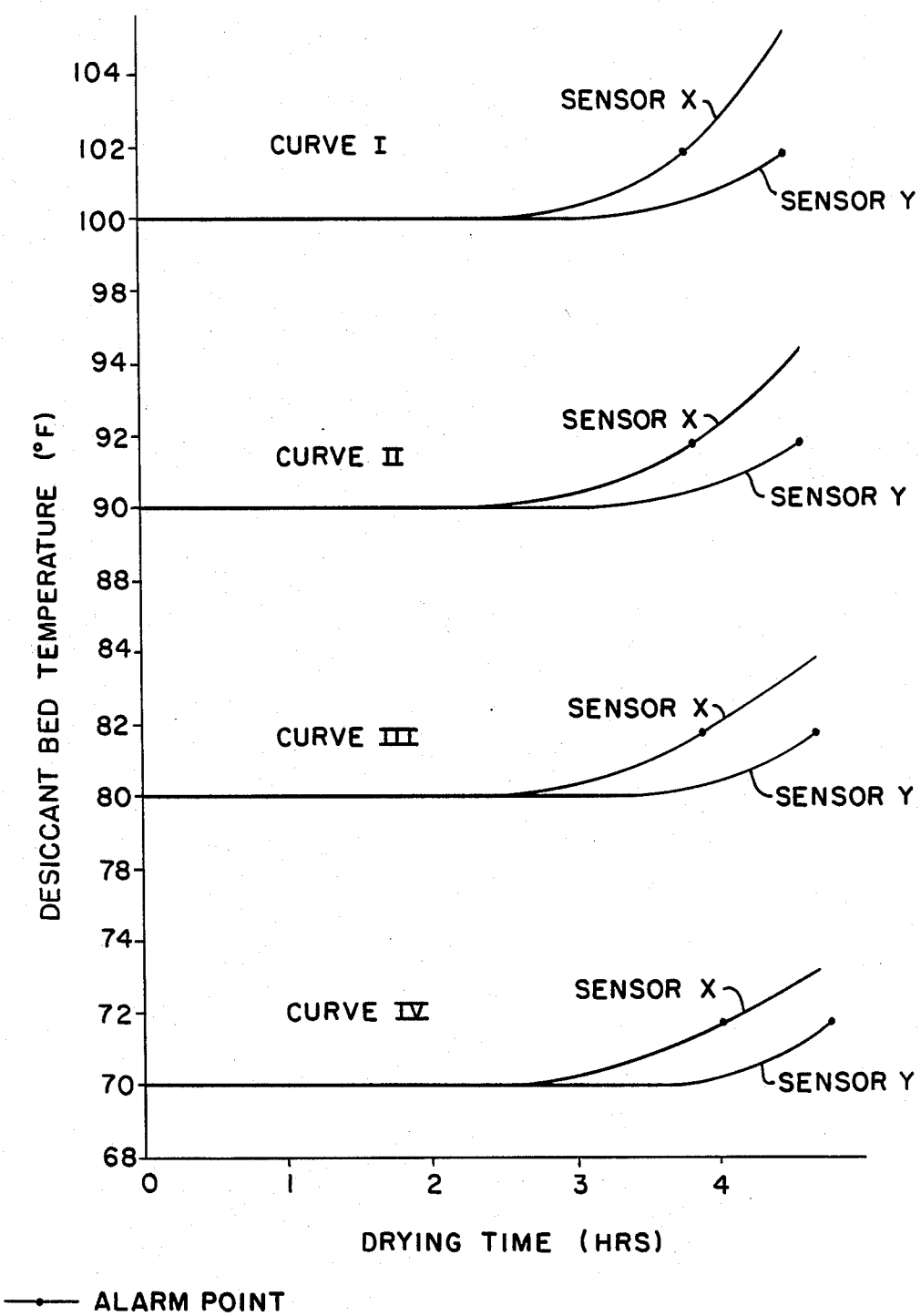
FIG. 8 is similar, but was obtained using twelve sensors at various points from end to end of the bed, and shows the progress of a moisture front from the inlet to the outlet of the bed at 90% relative humidity and 100° F.

The data for FIGS. 1 and 8 was obtained on air at a line pressure of 90 p.s.i.g. and a superficial flow velocity of 50 ft./min., using silica gel as the desiccant in a bed 54 inches long, and 12 inches in diameter. However, the data is typical of that obtainable using any desiccant under any adsorption conditions.

The principle of the process of the invention is to detect and halt the cycle before the change in slope S of the moisture front has reached the outlet, i.e., in FIG. 1, before about $5\frac{1}{2}$ hours cycle time for Curve I, about $9\frac{1}{4}$ hours cycle time for Curve II, about 15 hours cycle time for Curve III, and 23 hours cycle time for Curve IV, and in FIG. 8, before about $5\frac{1}{2}$ hours cycle time. The curves of FIG. 1 show that this can be done by terminating the cycle in the case of Curve I whenever the dewpoint level at point $X_1$ in the bed rises from $-100°$ F. up to but not to exceed $-10°$ F., and at point Y, up to but not to exceed $-45°$ F. In the case of Curve II, the cycle is terminated whenever the dewpoint or moisture level has risen from $-90°$ F. up to but not to exceed about $+10°$ F. at point $X_2$ and about $-25°$ F. at point $Y_2$. On Curve III, the dewpoints are about $-15°$ F. at $Y_3$, and $+30°$ F. at $X_3$. On Curve IV, the dewpoints are $0°$ F. at $Y_4$ and $+30°$ F. at $X_4$. All of these dewpoints are susceptible of detection by available humidity sensing equipment.

The difficulty in applying this approach, as a practical matter, arises from the inherent inaccuracy and unreliability of the available moisture sensing devices. These devices are complex, costly, and difficult to maintain in operating order. They also have a limited dewpoint range of detection capability.

A further difficulty is that the moisture front is preceded by the temperature front or heat front in its advance through the bed. As a result, the temperature front can break out of the bed, with loss of heat that ought to be conserved for regeneration, before the advance of the moisture front is detected.

In accordance with the instant invention, a process and apparatus for drying gases are provided which make it possible effectively not only to utilize the moisture capacity of a desiccant bed, but also to conserve in the bed heat liberated during adsorption for use during regneration, by detecting the advance of the temperature front in the bed, and providing for regeneration of the bed only when the temperature front has reached a predetermined point in the bed. In consequence, since the temperature front advances through the bed in like manner as the moisture front, but preceding it, regeneration is provided only when the moisture load on the bed requires it. During each adsorption cycle, the sorbent can be brought to a limiting moisture capacity at which regeneration can be effected under the available regenerating conditions, whether these be with or without the application of a reduced pressure. Thus, in accordance with the invention, by detecting the advance of the temperature front within the bed and halting the adsorption cycle whenever the temperature front has reached a predetermined point in the bed, both the temperature front and the moisture front can be prevented from breaking out of the bed. This can be done automatically by providing in the desiccant bed at a sufficient distance from the effluent outlet means for sensing the temperature of the bed, and means responsive to temperature to halt the adsorption cycle whenever a predetermined temperature or temperature gradient is reached in the bed at that sensing means.

The existence and advance of a temperature front accompanying the moisture front passing through a bed of desiccant as it gradually adsorbs moisture has not been recognized in the desiccant drying art. Lou U.S. Pat. No. 2,561,441, patented July 24, 1951, recognizes that as a sorbent sorbs moisture from gas passing over it, heat of adsorption is liberated, and the bed heats up. This heat is however carried off by the effluent gas from the desiccant bed, and is not utilized to gauge the degree of saturation of the bed. What Lou does is continue the adsorption cycle until the gaseous effluent is at the same temperature as the influent gas. By this time, no detectable heat of adsorption remains to be carried off, and of course adsorption has long ceased, due to saturation of the bed. Both the temperature front and the moisture front have broken out of the bed, wet effluent is being delivered, and the cycle is halted too late.

It has now been discovered that the advance of the temperature front in the desiccant bed can be accurately detected, because this advance is signalled by a decrease in the heat of adsorption released in the bed, which occurs when the sorbent capacity of the desiccant approaches saturation. As a result, since heat of adsorption is no longer being released, the temperature of the bed either stops increasing, or actually decreases. If the temperature of the bed be measured and plotted against time, this usually sudden levelling off or decrease in temperature is noted as a change in slope, and since less moisture is being adsorbed, the moisture content of the effluent gas increases, and rapidly approaches the moisture content of the influent gas. The resulting change in slope, either a plateau or a hump-shaped portion of this curve, in effect represents the temperature front. If this be observed in terms of the length of the bed, it will be found to progress for the influent end to the effluent end of the bed, as the adsorption cycle proceeds. The invention therefore concludes the cycle before the temperature front reaches the end of the bed, since thereafter the loss of heat that ought to be conserved for regeneration and the delivery of undesirably moist effluent can hardly be prevented.

In accordance with the invention, this is prevented by detecting the advance of the temperature front at a point in the bed sufficiently spaced from the effluent end to permit terminating the drying cycle before either the temperature front or the moisture front reaches the effluent end. How this is done is best seen in reference to FIGS. 1 to 4.

FIG. 1 shows the moisture front and temperature front advances in a desiccant bed during the drying of a gas in a heaterless dryer, the latter preceding the former. In a heaterless dryer, the temperature of the desiccant bed is cooler than the influent gas temperature at the beginning of the cycle, due to the cooling effect on the bed of evaporation of the adsorbed gas during regeneration. Thus, the influent gas is cooled, and initially the effluent gas is at a lower temperature than the influent gas. As the adsorption continues, heat of adsorption and heat of wetting are liberated, and the bed temperature increases. The gas passing through the bed is warmed and the effluent gas temperature increases. As the bed approached saturation, the temperature either levels off, or decreases. The resulting change in slope of the temperature curve shows either a plateau or a bulge, which is referred to as a hump, and which indicates the leading edge of the temperature front and the near-following moisture front.

Figure 2A:
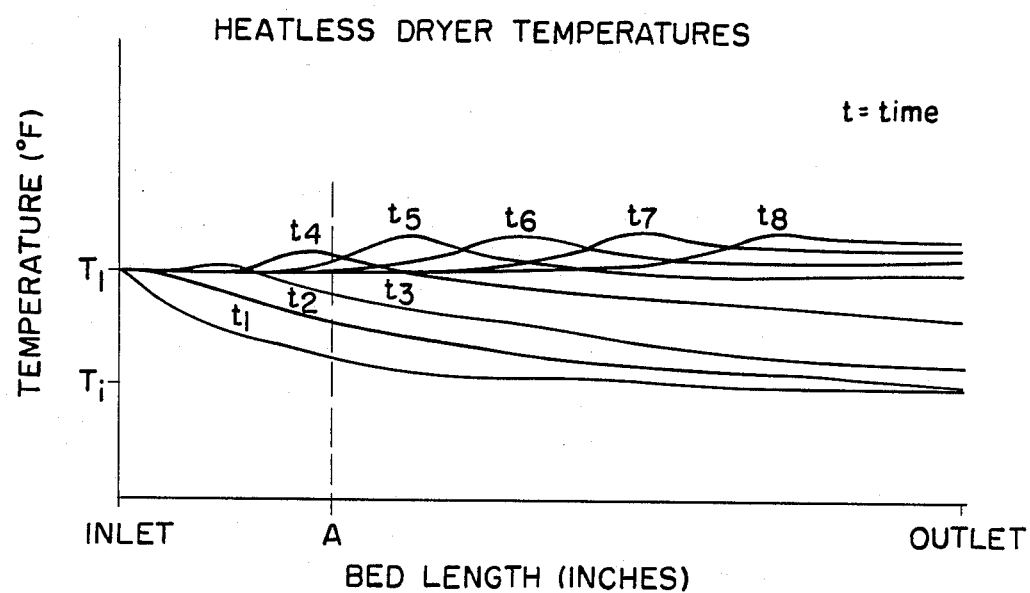

FIG. 2A is a temperature profile through the desiccant bed of FIG. 1, according to the length of the bed.

Figure 2B:
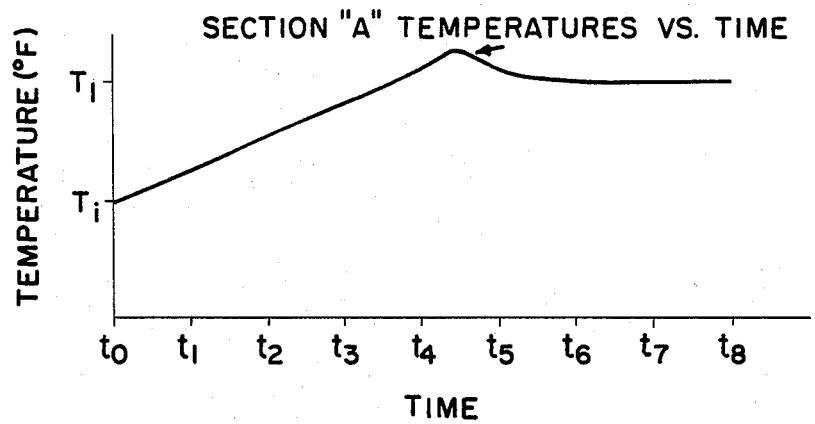

FIG. 2B is a temperature profile through region "A" of FIG. 2A.

Both Figures show the initial heating of the bed by the warming influent, the temperature rise due to the liberation of the heat of adsorption, and the cooling effect of the influent after saturation, as the temperature front moves down the bed.

Figure 3:
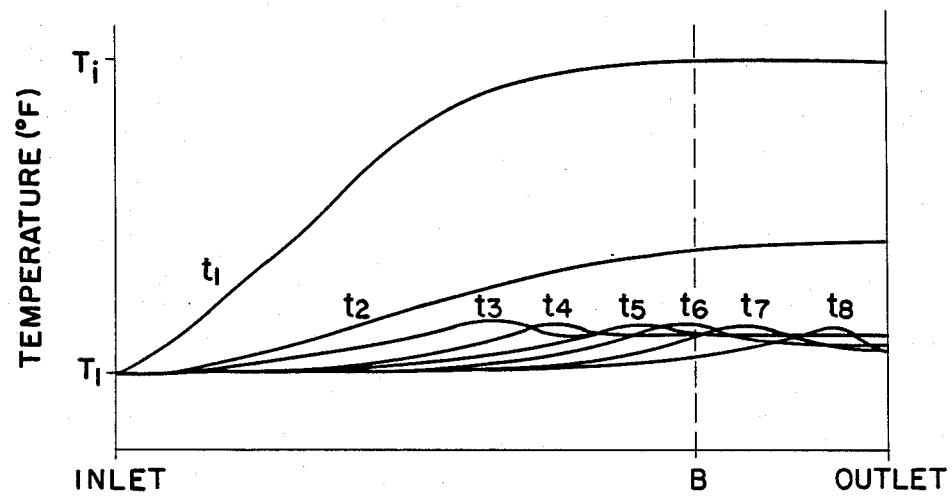

FIG. 3 describes the same effects in a heat-regenerated dryer. In this case, the initial bed temperature is warmer than the influent, due to elevated temperature during regeneration, and incomplete cooling.

Figure 4:
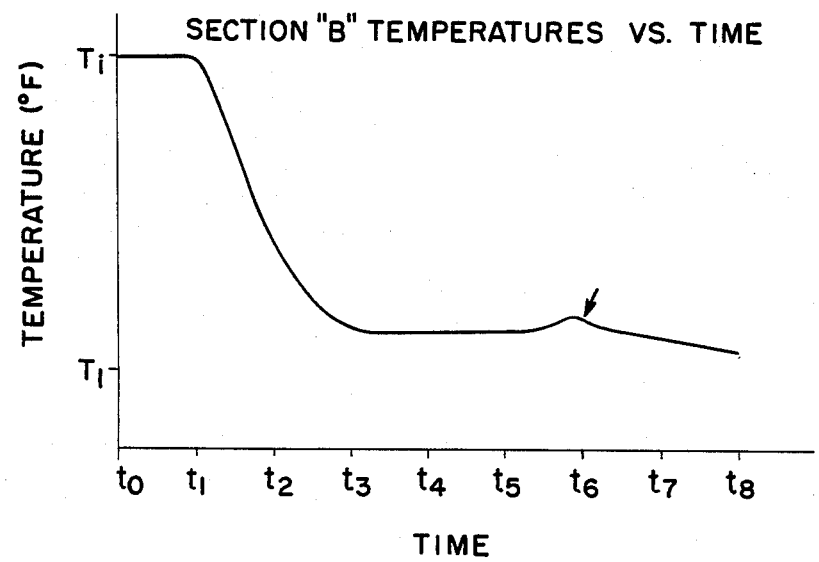

FIG. 4 is a temperature profile through region "B" of FIG. 3 and shows the initial cooling of the bed by the influent, the temperature rise due to the passing of the adsorption front, and the cooling effect of the influent after saturation as the temperature front moves down the bed.

The data for FIGS. 1 to 4 was obtained on air at 80% relative humidity at 100° F. The data is typical of that obtainable using any desiccant under any adsorption conditions.

The principle of the process of the invention is to detect and halt the cycle before the change in slope S of the temperature front (and therefore the moisture front) has reached the outlet. The curves of FIGS. 1 to 4 show that this can be done by terminating the cycle whenever the temperature in the bed either levels off or starts to decrease.

Thus, in the process of the invention, the concentration of a first gas in a mixture thereof with a second gas is reduced to below a limiting maximum concentration thereof in the second gas, by passing the mixture in contact with and from one end to another end of bed of a sorbent having a preferential affinity for the first gas; adsorbing first gas thereon to form a gaseous effluent having a concentration thereof below the maximum, and forming a concentration gradient of first gas in the bed progressively decreasing from one end to the other end as the adsorption continues, and an increasing concentration of first gas in the second gas defining a concentration front progressively advacing in the bed from the one end to the other end as sorbent capacity therefor decreases; heat of adsorption being liberated in the bed as the adsorption of first gas continues, the heat liberated first increasing, then levelling off and decreasing, as the sorbent becomes loaded with first gas, the heat of adsorption forming a temperature front in the sorbent bed reflecting the changing temperature of the bed, progressively increasing while adsorption of first gas in the bed continues, and then leveling off and progressively decreasing when adsorption of first gas in the bed ceases; detecting the advance of the temperature front in the bed as the change in temperature in the bed; and then when the change in the temperature of the bed has reached a predetermined value corresponding to a selected degree of saturation of the bed with respect to first gas, discontinuing passing the gaseous mixture in contact with the bed before the temperature front can leave the bed, and the limiting maximum concentration of first gas in the second gas can be exceeded.

This invention is applicable to systems wherein all or part of the sorbent bed is heated to effect regeneration; to systems wherein no heat is applied to effect regeneration; to systems wherein regeneration is effected at reduced pressure; and to systems utilizing a purge gas flow; and to systems combining one or more of these features.

As a further feature in accordance with the invention, the completeness of the regeneration can be detected by the temperature front or gradient in the bed. Regeneration requires heat, absorbed as heat of sorption in desorbing first gas from the bed, which exerts a cooling effect while desorption is continuing. When desorption is complete the bed retains whatever heat remains. Consequently, complete regeneration can also be detected as a temperature front passing through the bed, in which the temperature either levels off, if no heat is being applied during regeneration, as in a heaterless system, or increases, as in a heat-regenerated system.

Since the regeneration cycle need not be and in most cases is not of a duration equal to the absorption cycle, the bed being regenerated can be closed off, and heating purge, evacuation, or whatever regeneration system is used discontinued when regeneration is complete. The remainder of the cycle time can be used, for instance, for cooling down the regenerated bed, so that it is at a convenient and efficient temperature for adsorption when the flow of influent gas to that bed is removed.

The gas fractionating apparatus in accordance with the invention comprises as the essential components a sorbent bed adapted for periodic and preferably counterflow regeneration, and one or a plurality of temperature sensing means in the bed for detecting the arrival of the temperature front therein at a point in the bed sufficiently distant from the effluent end thereof to enable termination of a cycle before the adsorption front can leave the bed.

Optionally, the apparatus includes means for applying heat during such regneration. Such means can extend throughout the bed, or can be limited to only that portion of the sorbent bed having a high first gas content, of the order of 20% of its capacity or higher, at the conclusion of an adsorption cycle, i.e., to only that portion first contacted by influent flow during an adsorption cycle. In this case, the remainder of the sorbent bed is not heated during regeneration, and consequently not heating means are provided therein. The unheated proportion of the bed volume can accordingly be as large as desired. Usually from one-fourth to three-fourths of the bed volume, preferably from one-third to two-thirds of the volume, will be heated.

In effect, the unheated portion of such a bed constitutes a reserve bed, which in the normal adsorption cycle may be not required at all, and in which in any case the sorbent is apt to adsorb only a relatively small proportion, less than 20% of its capacity of first gas, but which is present in order to prevent the delivery of effluent gas of undesirably high first gas content in the unlikely event that first gas is not sufficiently adsorbed in the portion of the bed provided with heating means. The first gas adsorbing capacity of the reserve portion of the bed is so little used that the reserve sorbent is regenerated by the purge flow wherther or not the purge flow is heated, and any first gas carried forward from this portion by purge flow therethrough is of course effectively removed from the bed after passage through the heated portion thereof.

While the apparatus of the invention can be composed of one sorbent bed, the preferred apparatus employs a pair of sorbent beds, disposed in appropriate vessels, which are connected to the lines for reception of influent gas to be fractionated, and delivery of effluent gas. One bed can be on-stream for adsorption while the other is being regenerated, and thus a two-bed system can provide a continuous flow of the effluent fraction.

The apparatus can also include a check valve or throttling valve for the purpose of reducing pressure during regeneration, and multiple channel valves for cycling the flow of influent gas between the bed and for receiving the flow of effluent gas therefrom. In addition, a metering or throttling valve can be included to divert a portion of the effluent gas as purge in counterflow through the bed being regenerated.

The temperature sensing means can sense temperature at any portion in the sorbent bed.

To some extent, the position of the sensing means in the bed is determined by the rate of flow of effluent gas through the bed, allowing the sensor time to react to the changes in temperature before the temperature front breaks through the bed. In general, the higher the rate of flow, the further the sensing means should be placed from the effluent end of the bed, so as to ensure that the temperature front is detected soon enough to prevent its leaving the bed and entering the system being conditioned.

The type of temperature sensing device and the position of its sampling probe in the bed will be selected to detect the portion of the temperature front being observed as the gauge of when to terminate the cycle in time to give a signal before one of the temperature front or the adsorption front can leave the bed. The margin of safety required for a particular system is easily determined empirically, obtaining data and plotting the curves shown in FIG. 1 or FIG. 3 for the particular system to be used. This one skilled in this art can do without the exercise of invention.

Determination of the time required for the adsorption front to break through the sorbent bed is made using the following equation:

$$\gamma = \frac{M \rho b A x L}{\rho_o \; WSCFM} (1 - 2T_f \sqrt{C H_d/L} + (C H_d T_f/L)$$

where
SCFM = Flow rate, Std. (70° F., 14.7 psig) cu. ft./min.
M = Adsorbent Capacity for Solute, lb. Solute/lb. Adsorbent $$M = M_e - M_r$$

$M_e$ = Equilibrium Capacity at Inlet Temperature and Relative Humidity
$M_r$ = Residual Solute Concentration in Adsorbent
$\rho b$ = Adsorbent Bulk Density, lb/cu. ft.
Ax = Bed cross sectional area, sq. ft.
L = Bed active (regenerated) length, ft.
$\rho o$ = Fluid density at S.T.P., lb/cu. ft.
$\gamma$ = Adsorption time to break through, Min.
W = Inlet Solute ratio, lb Solute/lb Dry Gas
$T_f$ = Correction Factor for non-linearity of isothermal and non-isothermal adsorption.

$$T_f = (M/M_a)$$

$M_a$ = Equivalent capacity at adsorption zone temperature and relative Humidity
C = Solute Concentration Reduction Factor
C = −2.0287 Log $(c_1/c_o)$ − 1.221 $[1 − (c_1/c_o)]$ $c_1$ = Outlet solute concentration
$c_o$ = Inlet solute concentration (consistent units)
$H_d$ = Height of mass transfer unit, ft.

The temperature detecting device will usually include a sensing probe opening into the sorbent bed at one end and to the atmosphere at the other, with a temperature sensing component or sensor in the bed that responds in a positive way to the temperature of the bed.

The sensor responding to temperature can be electrical or mechanical or chemical or any combination thereof, but it is preferably arranged in response to temperature change to signal or control suitable valving, so as to conclude the adsorption cycle, and switch the influent and effluent gases from one tank to the other, at the time the maximum first gas level in the effluent gas is reached.

The time required for the first gas content in the effluent gas to reach a predetermined level is directly correlated with the sorbent capacity and first gas content of the sorbent. As the gas proceeds across the length of a sorbent bed, its first gas content is progressively diminished, according to the rate of adsorption of first gas by the sorbent, and heat of adsorption is progressively liberated. Since the rate of adsorption of first gas by the sorbent is dependent upon the first gas capacity, the gas pressure, the temperature and the rate of flow of gas, and determines the rate of heat liberation it will be apparent that for a given temperature and pressure of influent gas, the predetermined maximum first gas level of the effluent gas at which cycling is to be initiated will be reached only when the first gas load of the sorbent and the temperature of the sorbent have also reached a predetermined level. Consequently, it is possible in accordance with the invention to adjust the adsorption cycle length almost precisely in accordance with the first gas content or load of the sorbent, and thus effectively utilize the first gas capacity thereof in each drying cycle, without however introducing a danger of breakthrough of either the temperature front or the adsorption front.

Consequently, the gas fractionators in accordance with the invention operate to a predetermined load of first gas on the sorbent during each adsorption cycle. This means that if the first gas level of the influent gas varies, the adsorption cycle length is also automatically adjusted accordingly. The result is that an adsorption cycle is not terminated until it is necessary to do so, and unnecessary regenerations of the sorbent are eliminated. It thus also becomes unnecessary to build in a reserve capacity of sorbent. Since the adsorption cycle depends on the capacity of the volume utilized, a smaller volume of sorbent than was formerly required will now be sufficient. At the same time, the volume of purge lost during each cycle is kept to an absolute minimum. In effect, the gas fractionators of the invention automatically time their adsorption cycles according to the demand made upon them by the first gas content of the influent gas, and consequently the fractionators in accordance with the invention are referred to as demand cycle fractionators.

The regenerating cycle, on the other hand, need not be and preferably is not automatically the same in length of time as the adsorption cycle. Unlike most fractionators, since the adsorption cycle can be very greatly lengthened according to demand, the regenerating cycle can be time-controlled or temperature sensor controlled, to end when regeneration is complete, even if the adsorption cycle continues. This also will ensure that the purge flow and energy used in any heating of the bed will not be wasted when no longer needed. The regeneration cycle can be linked to the temperature sensor, to end when the temperature levels off, or starts to increase, indicating heat for desorption is no longer being absorbed, before the adsorption cycle ends, if this be before the timed regeneration cycle is completed. The temperature sensor also can be linked to the regeneration cycle timer, to be ineffective to end the adsorption cycle until regeneration be complete. Which of these two systems is preferable will depend on the system conditions.

Determination of the time required in the adsorption cycle for the temperature front to break through the sorbent bed is made using the following equation:

$$\gamma_a = \frac{C_{pd} \rho_b}{h \times a} \left[ \frac{h \times a \times L}{\rho \times C_p \times u_o} + C - 2\sqrt{\frac{C \times h \times a \times L}{\rho \times C_p \times U_o}} \right] \text{Min.}$$

where:
L = Adsorbent bed length, feet
$U_o$ = Superficial fluid velocity, ft./min.
$\rho$ = Fluid density lb/cu. ft.
$C_p$ = Fluid specific heat, BTU/lb$_m$−°F.
$\gamma_a$ = Adsorption time, minutes
$\rho_b$ = Adsorbent bulk density, lb/cu ft.
$C_{pd}$ = Adsorbent specific heat, BTU/lb$_m$−°F.
C = Temperature reduction factor
h = Heat transfer coefficient, BTU/min.−sq. ft.−°F.
a = Adsorbent external surface area, sq. ft./cu. ft. of bed The temperature reduction factor, "C", is derived from the temperature reduction ratio and the error function:

$$C = [(2X - 1)/(-\text{erf})]^2$$

where
$X = (t_2 - t_1)/(t_a - t_1)$
$t_2$ = Final outlet temperature, °F.
$t_1$ = Inlet (or bed) temperature, °F.
$t_a$ = Adsorption temperature, °F.

Any type of temperature sensing component or sensor can be used in accordance with the invention.

The levelling off or decrease in sorbent bed temperature that accompanies passing of the temperature front in both the heaterless and heat regenerated systems can be readily and reliably detected by any of a number of simple temperature sensing devices, such as termocouples, thermistors, and temperature transducers. These can be used in a number of ways to control the cycling of the system.

Exemplary available temperature sensing devices include:

1. Integrated Circuit Temperature Transducer
2. Thermistor
3. Platinum Resistant Thermistor (RTD)
4. Thermocouple
5. Bimetallic Temperature Switch Types (1), (2) and (3) are all considered temperature transducers, in that they indicate temperature as a function of electrical resistance or current.

In a heaterless fractionator, there are three basic methods of sensing the passage of the temperature front, altough other methods or combinations of these methods can be devised.

1. Switch actuation when the bed temperature less the inlet temperature ($T_{max}-T_1$) equals a predetermined value, normally 0.2° F. to 20° F., or, stated another way, when the bed temperature increases to a value equal to the inlet temperature plus a predetermined value, normally 0.2° F. to 20° F.

2. Switch actuation upon sensing a positive, steady-state or negative temperature gradient as a function of time.

3. Switch actuation upon sensing a temperature increase or reduction of a predetermined value, normally 0.2° F. to 20° F., after reaching a selected bed temperature during the drying period.

In a heaterless gas fractionator, the positive, steady-state or negative temperature gradient or slope $\Delta T/\Delta t$, i.e., the onset of a change in the temperature, can be used to control the purge flow needed to regenerate the bed after switchover to a second sorbent bed in a two chamber system. With heaterless fractionators it is best to leave the adsorption cycle constant, regardless of the first gas loading rate, to prevent dissipation of the heat of adsorption. Therefore, the time at which the temperature change or gradient occurs (t) can be used in computing the purge required for complete regeneration. If the temperature sensor is installed or positioned at the region where the temperature front should be (by calculation) at the end of the drying period, then the required purge can be computed by the following simple equation:

$$Q_p = Q_f(t_f/t) \quad (I)$$

where
$Q_p$ = actual purge required (SCF)
$Q_f$ = calculated purge required (SCF)
$t$ = time to change in temperature gradient, seconds
$t_f$ = adsorption cycle time, seconds.

Another method in a heaterless fractionator is to maintain a fixed purge flow, such as with a flow orifice, during regeneration, and regulate or modulate the purge flow time as a function of time (t) at which the negative temperature gradient occurs. It is also better to install the temperature sensor at a location where the temperature front passes before the end of the cycle, say 25% to 75% of the cycle, and modulate the purge as a function of when the front actually passes the sensor: if the front passes sooner than calculated, excess purge would be called for, and if after, then less purge would be called for. For example, assuming that the purge orifice is sized to maintain purge flow for 75% of the regeneration period under maximum loading conditions (leaving 25% for repressurization) and installing the temperature sensor where the temperature front should pass by after ½ of the adsorption cycle time under maximum loading conditions, then the purge or cycle time required can be computed by the following simple equation:

$$t_p = 1.5 (t_f - t) \quad (II)$$

where
$t_p$ = purge-on cycle time, seconds
$t_f$ = adsorption cycle time, seconds
$t$ = time to change in temperature gradient, seconds Maximum purge should be consumed in a heaterless fractionator if no change in gradient is sensed, as this would indicate that the temperature front is downstream of the sensor. Maximum purge will eventually cause the temperature front to move into the sensor region. When no change in gradient is sensed, "t" should be at "0" in both Equation I and Equation II; $Q_p$ is then limited only by the purge flow controller and "$t_p$" is limited to "$t_f$" less repressurization time.

Other methods of determining the purge flow requirements using a temperature sensor to monitor the position of the temperature front will be apparent to those skilled in the art.

In a third method, the system is furnished with an inlet temperature probe and one probe in each desiccant bed near the inlet ends. The bed sensors are located such that the temperature front will pass by the probes at 25% of the adsorption period under normal operating conditions. If the front passes by the probe sooner than 25% of the adsorption period, such as under conditions of excessive flow rate of abnormally high first gas loading conditions, the purge control timer will allow extra purge time. On the other hand, if the first gas load is low, the temperature front will pass by the probe location after than 25% of the adsorption period, resulting in less purge time during regeneration.

In a heat regenerated gas fractionator, the temperature sensor can be used in a similar manner to the hydrometer sensor as described in U.S. Pat. No. 3,448,561. In heat regenerated fractionators the cycle is normally much longer than in heaterless fractionators. The adsorption cycle can be increased to match the first gas loading conditions of the fractionators. The temperature sensor can be located at the region where the temperature front should be by calculation before the adsorption front breaks through at the outlet. This is normally from ½ to ¾ of the bed length from the effluent or outlet end. When a change in temperature gradient (after the initial bed cooling period) occurs, the beds are switched over and the wet bed is regenerated over a fixed period of time. The regenerator bed is then held off stream until the temperature sensor indicates complete usage of the second bed. The beds are then switched over again.

With both the heat regenerated and heaterless dryers, an inlet temperature probe can be used to indicate a change in the influent conditions which might affect the probe reading in the bed. A sudden change in inlet conditions can create a change in temperature gradient at the bed sensor, incorrectly indicating the passage of the temperature front. The inlet temperature probe can be used to correct this error by warning the bed probe of an impending false indication.

Numerous means are available of converting a change in temperature gradient into a control signal for regeneration, both mechanical and electrical. Electrically, either a simple digital electronic system cna be used, or a microprocessor.

Figure 5:
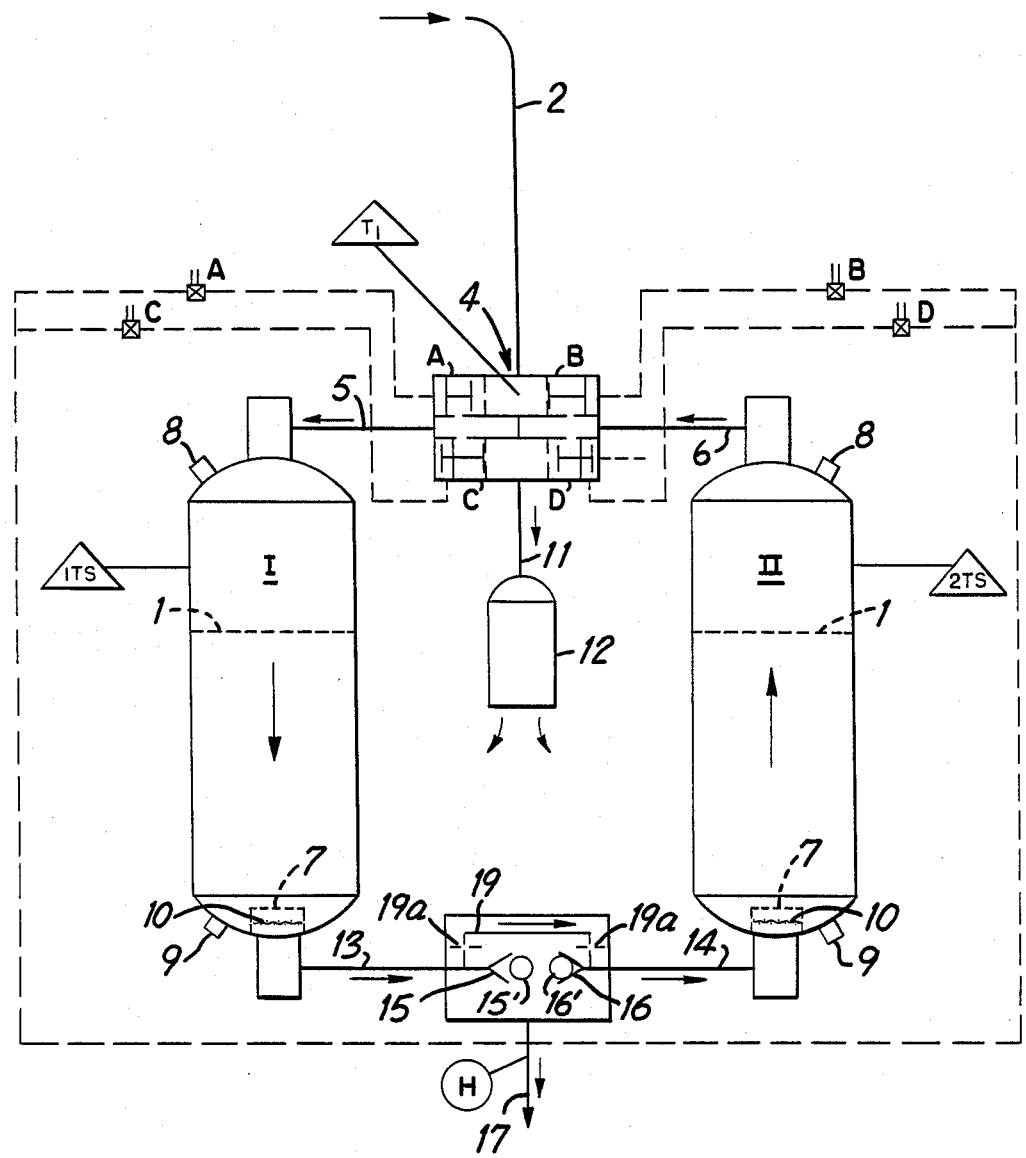
Figures 6A, 6B:
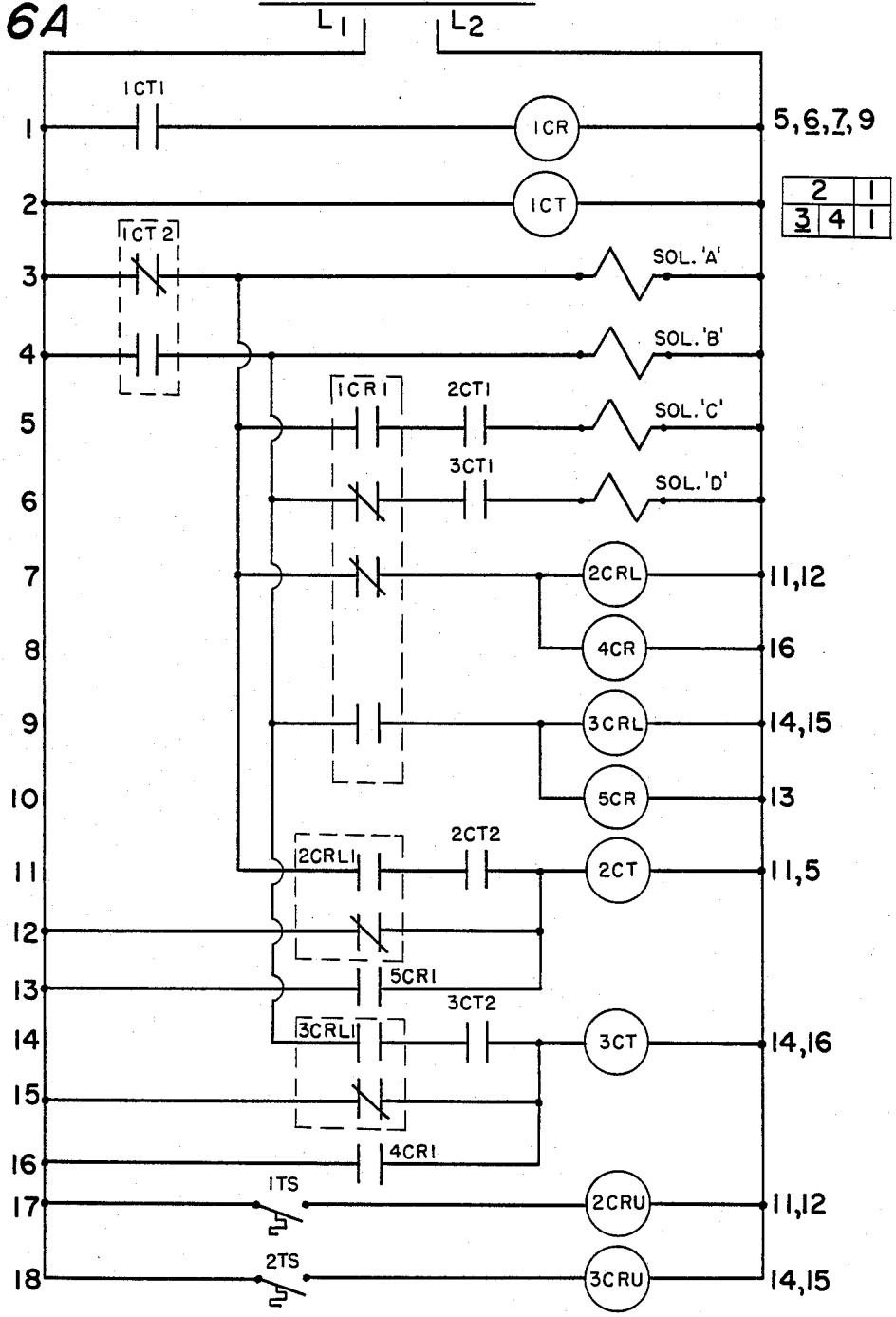
Figure 7:
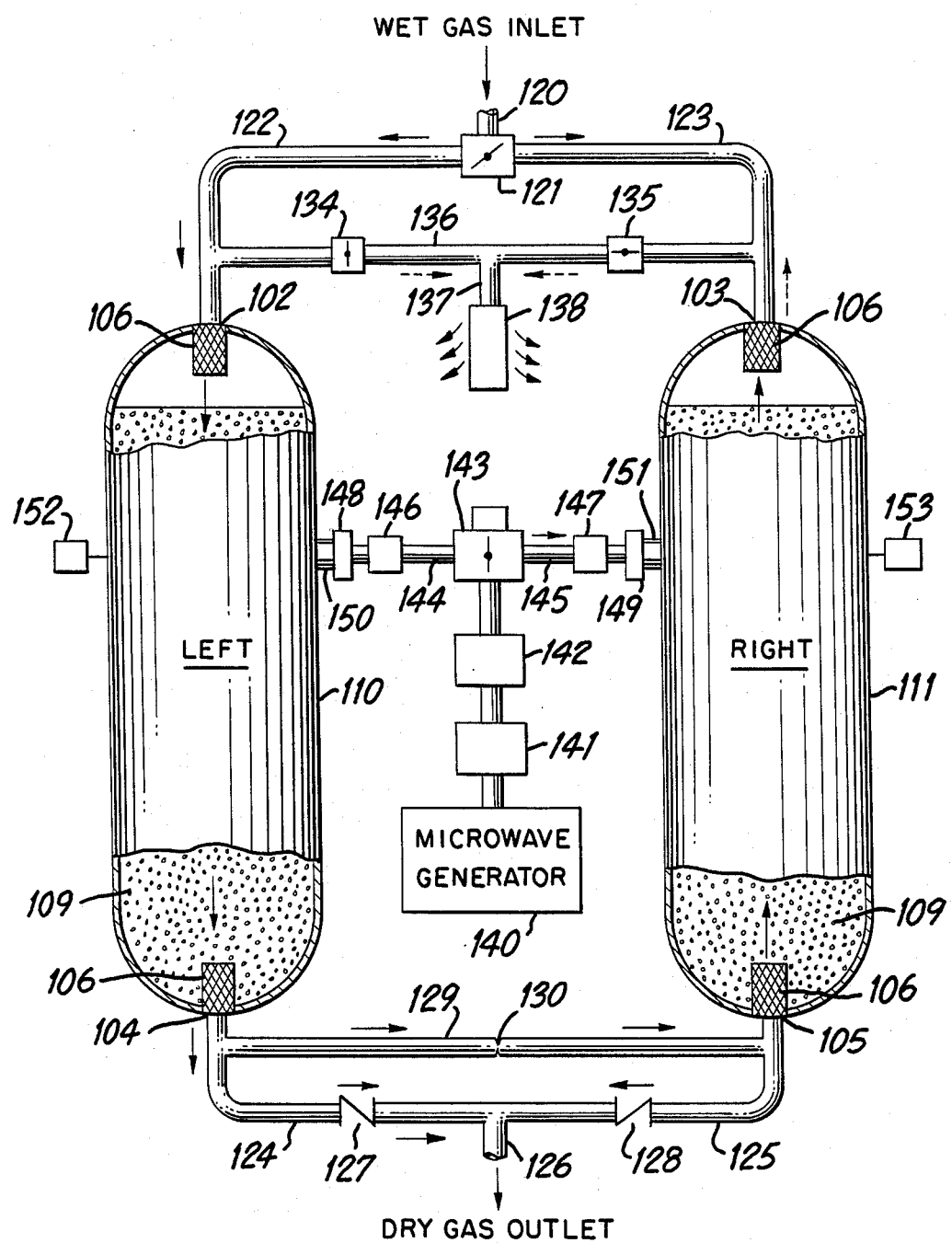

The apparatus of the invention is illustrated in the following drawings, in which:

FIG. 5 is a schematic view of a two-bed heaterless desiccant dryer in accordance with the invention:

FIG. 6A is a schematic wiring diagram of the temperature sensing and operating control circuit of the heaterless dryer in accordance with FIG. 5;

FIG. 6B is a time block diagram showing the operating sequence of the cam timers of FIG. 6A to control cycling switchover of the beds; and FIG. 7 is a schematic view of a two-bed heat-reactivatable desiccant dryer in accordance with the invention.

Figure 9:
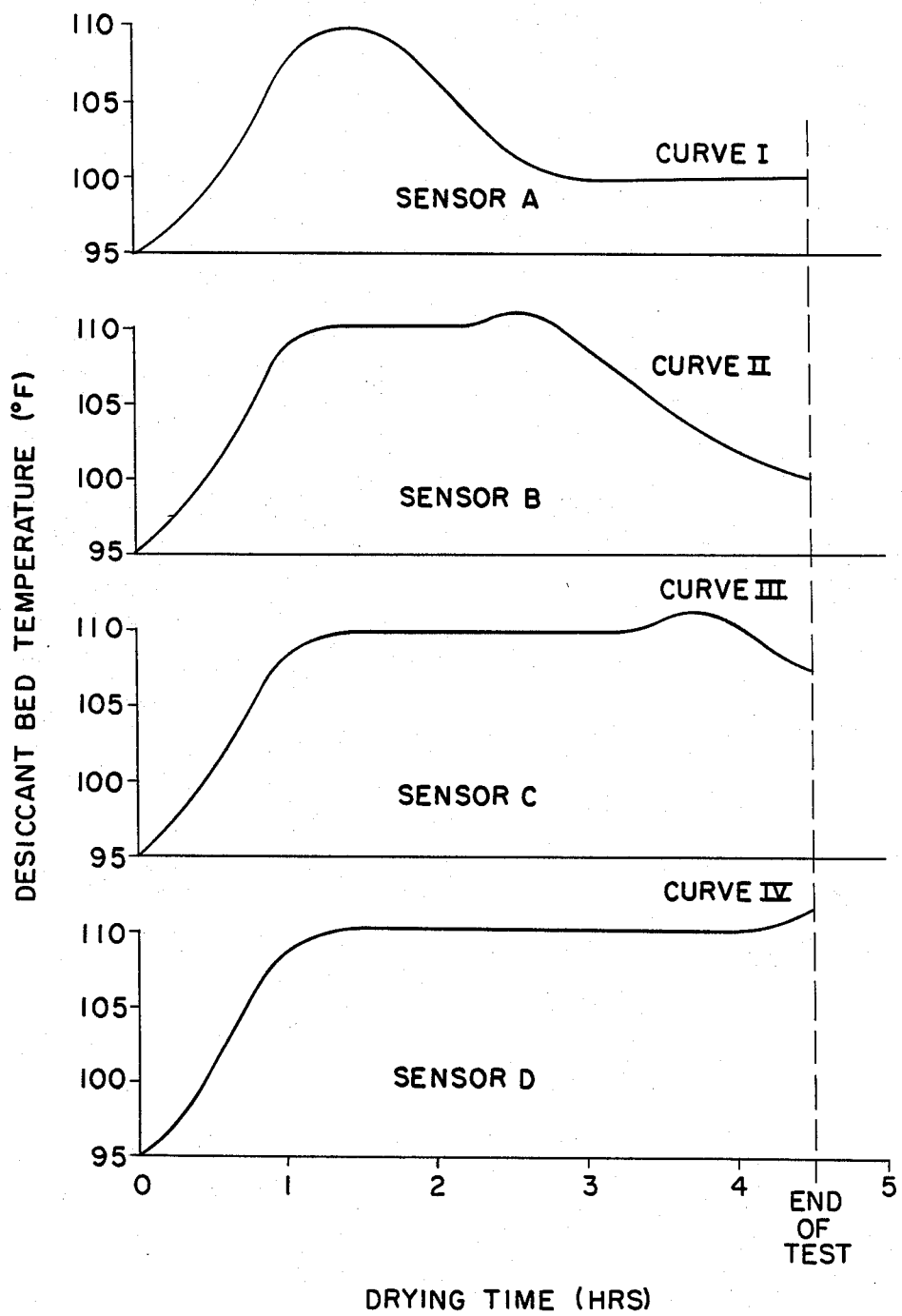

FIG. 8 is a graph of desiccant bed temperature °F. against drying time for the four drying cycle for which data is given in Example 1; and FIG. 9 is a graph of desiccant bed temperature °F. against drying time for the four drying cycles for which data is given in Example 2.

The dryer of FIGS. 5 and 6 is composed of a pair of desiccant tanks I and II. These tanks are disposed vertically. Each tank contains a bed 1 of desiccant such as silica gel or activated alumina. Also provided in tanks I and II are desiccant fill and drain ports 8, 9 for draining the filling of desiccant in the tanks.

Only two lines are required, connecting the two tanks at top and bottom, respectively, for introduction of influent gas containing moisture to be removed, and for delivery of dry effluent gas, free from moisture after having passed through the dryer, with the necessary values for switching flow of influent and effluent gas to and from each tank.

The line 2 conducts the moist influent gas to the fourcomponent inlet switching valve 4, including valves A, B, C, D. One of valves A, B directs the flow of influent gas to one of two inlet tanks 5 and 6, one of lines 5, 6 always leading the influent gas to the top of each tank I, II and the other of lines 5, 6 according to valves C, D leading the purge flow of regenerating effluent gas to the exhaust via line 11 and muffler 12 venting to atmosphere.

At the bottom of each tank is a desiccant support 7 made of a perforated metal cylinder, retaining the desiccant bed 1 in the tanks I and II. Outlet lines 13 and 14 from the bottom of tanks I and II, respectively, lead to the pair of ball check valves 15, 16. Inlet valve 4 is operated by the temperature sensing system shown in FIG. 6 which will be described later on.

Outlet valves 15, 16 are pressure operated. One of the balls 15', 16' in the effluent lines from the on-stream tanks I, II is displaced on switching and start up of on-stream flow in lines 13, 14 while the other one of the balls 15', 16' at such switching time moves against the seat, closing off the other of lines 13, 14 leading to the tank I, II undergoing regeneration at reduced pressure, and thus directing main effluent flow via the outlet line 17.

Disposed in each outlet line 13 and 14 is a filter screen 10, which is movable and is also made of sintered stainless steel wire mesh. This acts to retain any desiccant particles that might otherwise be carried out from the bed 1 past the desiccant support 7, to keep the outlet valves 15, 16 and the remainder of the system clean of such particles.

From valves 15, 16 extends the dry gas effluent delivery line 17, to deliver the dried effluent gas from the dryer to the system being supplied therewith. In the line 17 there can be placed a humidity sensor H, but this is optional, and can be omitted.

At valve 4A, B is a temperature sensor $T_1$, in tank I a second temperature sensor $TS_1$, and in tank II a third temperature sensor $TS_2$.

A cross line 19 having a narrow passage bridges the outlet lines 13, 14, bypassing valves 15, 16 when either is closed and providing purge flow to the line 13, 14 leading to the off-stream tank. Line 19 has an orifice 19a therein, which due to its small diameter has a pressure-reducing function, inasmuch as downstream thereof pressure is reduced to atmospheric when one of purge valves C, D is open and it also meters the volume of purge flow bled off the effluent gas at valves 15, 16 for regeneration of the spent tank. Purge exhaust valves C, D control purge flow via lines 11, 12 according to signal from the temperature sensing system which opens and closes them as needed. A pressure gauge can be added to read off the pressure in the valve C, D, and thus give the regeneration pressure in each tank as it is undergoing regeneration.

If the left-hand tank I is on the drying cycle, and the right-hand tank II on the regeneration cycle, then valves 4A and D are open, 4B and C closed, and the operation of the dryer proceeds as follows: wet gas influent at, for example, 100 psig, and a flow rate of 305 s.c.f.m., saturated at 80° F., enters through the inlet line 2, passes the valve 4A (valve B being closed) and enters the top of the first tank I, and passes thence downwardly through the bed of desiccant 1 therein, for example, silica gel or activated alumina, past temperature sensor 1TS, to the bottom of the tank, and thence through filter 10 and line 13, valve 15 to the dry gas outlet line 17. Effluent gas is delivered there at 100 psig and 265 s.c.f.m., dewpoint—100° F. The ball 16' prevents entry of dry gas into line 14 except via line 19. This metered remainder of the dry gas effluent, 40 s.c.f.m., is bled off through the line 19, where its pressure is reduced to atmospheric, and then passes through line 14 to the bottom of the second tank II, which is on the regeneration cycle. Purge flow passes upwardly through the desiccant bed 1, and emerges at the top into line 6, and thence passes through valve 4D, to line 11 and muffler 12, where it is vented to the atmosphere.

Since the time that each bed will be on the drying cycle is normally much greater than the length of time required to regenerate the spent bed, purge exhaust valves C, D are so actuated by the temperature sensing system that they are opened only for the time necessary to complete regeneration of the desiccant. When this time has elapsed, they are shut off, and the regenerated tank II is then automatically and slowly repressurized via line 19.

This cycle continues until the fixed cycle time has elapsed, whereupon the timer then switches valves 4A, B so that wet gas influent entering through the inlet 2 passes through line 6 to the top of tank II, while check valve 16 shifts to open line 14 whereupon check valve 15 shifts to close line 13, so that dry gas effluent can now pass from the bottom of the tank II to the dry gas delivery line 17, while line 13 is closed, except to the flow of pure gas bypassing valve 15 via the cross-line 19, now reversed. Purge flow proceeds via line 13 to the bottom of tank I, which is on the regeneration cycle, and thence upwardly through the bed to the line 5 and thence through valve 4C, line 11 and muffler 12, where it is vented to the atmosphere. This cycle continues until the regeneration time cycle is completed, whereupon the temperature sensing system closes purge exhaust valve C. Accordingly, line 19 slowly repressurizes tank I. The system continues with tank II on the drying cycle until the fixed cycle time has elapsed, whereupon the timer reverses valves 4A, B, and the cycle begins again.

Usually, the drying cycle is carried out with gas at a superatmospheric pressure, of the order of 15 to 350 psig. The narrow passage in the cross-line 19 in combination with the purge exhaust valves C, D ensures that the regeneration cycle is carried out at a pressure considerably reduced from that at which the adsorption cycle is effected.

The temperature sensing and operating control circuit shown in FIG. 6A has a two cam timer 1CT to control switchover from one chamber to the other, and to control adsorption cycle timing. Suitable cam timers are the Cramer No. CTB-2B-526; Bristol Saybrook No. C11; and Eagle Signal No. MP2.

Cam 1CT1 initiates switchover by ensuring repressurization of the regenerated off-stream chamber.

Cam 1CT2 completes the switchover by switching flow from the onstream chamber to the regenerated chamber.

The four solenoid valves A, B, C, and D control the positions of the inlet switching valve 4 and are in parallel connection to cam 1CT2.

Solenoid A operates the left chamber inlet valve, which is normally open, (N/O).

Solenoid B operates the right chamber inlet valve, also (N/O).

Solenoid C operates the left chamber purge exhaust valve, which is normally closed (N/C).

Solenoid D operates the right chamber purge exhaust valve, also (N/C).

Suitable solenoid valves are Gould Allied No. 3M781 and Asco No. 8262C46.

There are also two single cam timers 2CT and 3CT that determine the amount of purge time required and control the purge flow time during regeneration.

Timer 2CT controls the left chamber purge and Timer 3CT controls right chamber purge.

Suitable single cam timers are Bristol Saybrook No. C11, Cramer No. CTB-2C-526 and Eagle Signal No. MP2.

Two latch relays, 2CRL and 3CRL reset the purge control timers 2CT and 3CT.

Relay 2CRL resets the left chamber purge control circuit and relay 3CRL resets the right chamber purge control circuit.

Suitable latch relays are Clark Control No. 7302SML and Potter and Brumfield No. KUB.

Three control relays 1CR, 4CR and 5CR are provided, of which 1CR in conjunction with cam timer switch 1CT1 operates the purge exhaust control circuit, 4CR initiates operation of the right chamber purge control timer 3CT, and 5CR initiates operation of the left chamber purge control timer 2CT.

Potter and Brumfield No. R10E1W2, Square D No. 3501 and G. E. No. CR120L022002 are suitable control relays.

Four switches 2CT1, 3CT1 and 2CT2 and 3CT2 control energization of solenoids C and D and the cam timers 2CT and 3CT, respectively.

There are also two temperature switches 1TS and 2TS which unlatch, or trim, the latch relays 2CRL1 and 3CRL1 when the temperature front (and with it the adsorption front) passes the temperature sensors $TS_1$ and $TS_2$, respectively, in either direction.

Switch 1TS stops the left chamber purge control timer, and Switch 2TS stops the right chamber purge control timer.

United Electric No. J11, Omega No. 8000 and Burlington No. B-1C are suitable temperature switches.

A seen in FIG. 6B, there are a number of rotational cam positions of the cam timer 1CT in each of which the operation of the several component parts is different.

In the following description of the operating sequence, there are a total of 8 steps, numbered in corresponding number to the steps at the top of the graph in FIG. 6B.

Step 1:

In the starting cam timer position (0°), the switch 1CT1 opens, interrupting the operation of control relay 1CR which is deenergized; 1CR1 thereupon switches. Switch 1CT2 remains closed and energizes the circuit connected thereto.

Latching relay coil 2CRL is thus energized and 2CRL1 switches.

The timer 2CT remains energized, and starts totalling time. Switches 2CT2 and 2CT1 are closed.

Relay coil 4CR also remains energized, and control relay 4CR is closed.

Timer 3CT is energized and switches. Switches 3CT2 and 3CT1 are closed.

Solenoid A remains energized through switch 1CT2, the left chamber inlet vave remains closed. Solenoids B, C and D are deenergized, the chamber 1 inlet and exhaust are closed and the chamber is repressurizing, the chamber II inlet valve is open and the exhaust valve is sensor actuated closed.

Temperature switches 1TS and 2TS are both open, and remain open until the corresponding temperature sensors, $TS_1$ and $TS_2$ are actuated.

Step 2:

Upon rotation of the cam 30°, 1CT2 opens the circuit whereupon solenoid A is deenergized, which puts the left chamber I inlet open, and the left chamber I on the adsorption cycle. Solenoid B is energized, which puts the right chamber II inlet closed, and the right chamber II off stream for regeneration. Solenoid D is energized, which puts the right chamber purge exhaust valve open, and the right chamber on regeneration.

Timer 2CT continues running, accumulating time.

Timer 3CT continues running, powered now through latch relay 3CRL1, and switch 4CR1 opens.

Step 3:

Now let us assume that the temperature front passes the sorbent bed temperature sensor. Temperature now levels off and then decreases, whereupon the left chamber temperature switch is tripped. Accordingly, the latch relay unlatching relay coil 2CRU is energized Switch 2CRL1 is tripped (or switched). The timer 2CT is deenergized, and stops totalling time while switches 2CT2 and 2CT1 are opened.

Timer 3CT continues running; solenoid conditions remain unchanged.

Step 4:

When the purge timer times out, switches 3CT2 and 3CT1 open, while timer 3CT is deenergized, and stops running.

The solenoid D is also deenergized, so that the right chamber II exhaust valve is closed, and right chamber regeneration stopped.

Step 5:

Upon rotation of the cam 180°, switch 1CT1 closes. Then relay coil 1CR is energized and 1CR1 switches. Latching relay coil 3CRL is energized, and 3CRL1 switches. Timer 3CT is energized and starts totalling time. Switches 3CT2 and 3CT1 are closed.

Relay coil 5CR is energized and switch 5CR1 is closed. Timer 2CT is energized, and switches 2CT2 and 2CT1 are closed.

Solenoids A and B remain unchanged and so the left chamber continues on adsorption, with the right chamber offstream. Solenoids D and C are both deenergized;

accordingly, the right chamber now regenerated is repressurizing. Temperature switch 1TS opens.

Step 6:

Upon rotation of the cam 210°, 1CT2 switches.

Solenoid B is deenergized which puts the right chamber inlet open, so that the right chamber is on the adsorption cycle.

Solenoid A is energized which closes the left chamber inlet and takes the left chamber off-stream.

Solenoid C is energized, which opens the left chamber purge exhaust valve and starts purge flow through the left chamber for regeneration.

Timer 3CT continues running, accumulating time.

Timer 2CT continues running, powered now through latch relay 2CRL1; switch 5CR1 opens.

Step 7:

The right chamber now continues on the adsorption cycle until the temperature front (and with it, the adsorption front) passes the bed temperature sensor. This trips the right chamber temperature switch, whereupon timer 3CT is deenergized, and stops totalling time. Unlatching relay coil 3CRU is energized, latch relay 3CRL1 tripped (or switched); 3CT2 and 3CT1 are opened.

Timer 2CT continues running, and the solenoid conditions remain unchanged.

Step 8:

The left chamber continues on regeneration until the purge timer 2CT times out, whereupon switches 2CT2 and 2CT1 open.

Timer 2CT is then deenergized and stops running.

Solenoid C is deenergized which closes the left chamber exhaust valve, and halts regeneration of the left chamber.

The cycle is now ended, and a new cycle begins in the same sequence as above.

FIG. 6B shows the above-described operating sequence in graphical form.

The microwave-regenerated dryer shown in FIG. 7 is composed of a pair of tanks 110 and 111, each having at their ends an inlet 102 and 103, and at the other end an outlet 104 and 105. Disposed across the inlets and outlets of each are stainless steel support screens 106, made of wire mesh or perforated steel plate, the purpose of which is to retain the desiccant particles within the tanks under gas flow in either direction, and to prevent the transmission of microwave energy either upstream or downstream.

In this case, the tanks are filled with desiccant, activated alumina, but optionally a molecular sieve such as $Na_{12}[(AlO_2)_{12}(SiO_2)_{12}]3H_2O$ or a silica gel can be used. The desiccant particles are uniformly coated with graphite, in a thin film several micrometers thick, and in amount of about 0.01% by weight.

The tanks 110 and 111 are interconnected by a system of lines to ensure delivery of influent gas to be dried to the inlet of either bed, and the withdrawal of dried gas from the outlet of either bed, with lines for directing purge flow bled off from the effluent to the top of either bed for regeneration, and to vent it to atmosphere after leaving the bottom of each bed. This system is composed of a wet gas delivery line 120, which conducts wet gas to the four-way switching valve 121, and then through either line 122 or 123 to the top of tanks 110 and 111, respectively. Similar line connections 124 and 125 extend between the outlets of the two tanks. Flow along these lines to outlet line 126 is controlled by the check valves 127 and 128. Another line 129 interconnects lines 124 and 125 via a purge-metering and pressure-reducing orifice 130, which controls the volume of purge flow bled from the dry gas effluent for regeneration of the dryer bed on the regeneration cycle. The line 129 leads the purge flow through the orifice 130 to the outlets 104 and 105 of tanks 110 and 111. A purge exhaust line 136 interconnects lines 122 and 123 via exhaust valves 134, 135 to vent to atmosphere via the vent line 137 and muffler 138.

The dryers are adapted for regeneration by applying microwave energy to the sorbent bed in each tank. The microwave generator system is disposed intermediate the two tanks, and is composed of a microwave generator 140, a forward/reflect monitor 141, a microwave isolator 142, and a waveguide switch 143, which directs the microwave energy through one of the two sets of waveguides 144, 145, microwave tuners, 146, 147 and microwave pressure windows 148, 149, through which the microwave energy passes via the transition sections 150, 151 into the sorbent in one of the two tanks 110, 111 respectively.

Each tank 110, 111 also carries a temperature sensor 152, 153 connected to a control system like that of FIGS. 6A, 6B.

If tank 110 is on the drying cycle, and tank 111 on the regenerating cycle, then operation of the dryer is as follows: Wet gas at line pressures 25 to 350 psig entering through line 120 is diverted by valve 121 into line 122 to tank 110, and passes thence downwardly through the bed 109 to the outlet, whence it is conducted via line 124 past the open valve 127 to the exhaust line 126. Valves 128 and 134 are closed, preventing flow in line 125 from line 124 except via line 129 and orifice 130, and in line 136 from line 122, while valve 135 is open, permitting purge flow from tank 111 to proceed to vent line 137. A portion of the effluent is then passed through line 129, through orifice 130, where its pressure is reduced to atmospheric, due to open line 137, into line 125 to the bottom 105 of the second tank 111, which is on the regeneration cycle, and it passes thence upwardly through the bed 109 to the line 103 and thence through the line 136 and is vented to the atmosphere through the purge exhaust line 137 and muffler 138.

While this is going on, microwave energy is being produced in the microwave generator 140, and directed through the forward/reflect monitor 141 and isolator 142 into the switching device 143, where the microwaves are directed into the tank 111 through the microwave guide 145, microwave tuner 147, pressure window 149, and transition section 151. The microwave energy is absorbed by the microwave absorbent, graphite, which transmits it to water held in the desiccant, and the water is driven off as water vapor.

The purge gas flow is metered and reduced on pressure through the orifice 130, passes via lines 129 and 125 into the tank 111 at the outlet 105, and sweeps the desorbed water vapor out of the tank 111 through the inlet 103 and past the exhaust valve 135 in line 136 to the vent line 137 and the muffler 138, where it is vented to the atmosphere. When all of the water is driven out of the tank 111, a large percentage of the microwave energy will be reflected back through the waveguide 151 towards the microwave generator 140. The inlet and outlet screens 106 will prevent the energy from exiting in any other direction. The monitor 141 will sense the high percentage of reflected energy, and will shut off the microwave generator 140. The temperature sensor 153 serves exactly the same function as in the apparatus of FIG. 5, to switch the tanks when the temperature front (and with it the adsorption front) passes the sensor.

When the tank 111 is regenerated (as detected by the system described below), valve 135 is closed to permit repressurization of the tank 111. A predetermined minimum time period allows sufficient time for repressurization of tank 111. Thereafter, the tank 110 continues on the adsorption cycle until the temperature front has passed the temperature sensor 152 whereupon the switching valves 121 is rotatedd through 180°, so as to divert influent gas to line 123 to the top of the second tank 111 on the drying cycle, while at the same time the valves 127 and 135 are closed, and the valve 128 is opened. Valve 134 is now opened to depressurize tank 110 and open the purge system to atmosphere. Purge flow now passes through line 129, orifice 130 and line 124 to the bottom 104 of the tank 110. Which is now on the regeneration cycle. At the time valve 121 is switched the microwave generator 140 is turned on, and the microwaves that are generated are directed through the forward/reflect monitor 141 and isolator 142 into the switching device 143. The switching device now directs the microwaves into tank 110, through the microwave guide 144, microwave tuner 146, pressure window 148, and transition section 150, into the sorbent bed 109. The microwave energy is absorbed by the microwave absorbent, graphite, which transits it to free water sorbed on the desiccant 109 in the tank 110, and the water is driven off as water vapor. The purge gas, proceeding via orifice 130, lines 129 and 124 into the bottom of the tank 110, sweeps the desorbed water vapor out of the tank 110 through the inlet 102, exhaust valve 134, lines 136 and 137, and muffler 138 into the atmosphere.

When all of the water is driven out of the tank 110, a large percentage of the energy will be reflected back through the waveguide towards the microwave generator. The inlet and outlet screens 106 will prevent the energy from exiting in any other direction. The monitor 141 will then sense the high percentage of reflected energy, and will automatically shut off the generator. Then the valves 121, 127, 128, 134, and 135 are again switched at the end of the adsorption cycle, as sensed by the temperature sensor, and the cycle is repeated.

Whenever the tank 110 or 111 is on the regeneration cycle, the microwave generator 140 is activated, and the desiccant bed is desorbed while being subjected to the purge flow for the time required to fully regenerate the desiccant. This time may be considerably less than the drying cycle time, which of course is determined not by a fixed time cycle, but by the moisture level in the gas in the bed, as noted previously, whereupon the microwave generator is shut off.

Purge flow of gas is continued only for a time sufficient to cool the desiccant bed to room temperature, at which temperature at adsorption is more efficient, and then it too is automatically shut off by closing purge exhaust valves 134 and 135, repressurizing the spent bed, and readying it for the next cycle. Normally, from a half-hour too one hour is adequate to effect complete regeneration of a spent bed, and from ½ to 1 hour is enough to cool it. However, other times can of course be used, depending upon the desiccant that is employed.

A system for controlling regeneration based on the detection of the passage of the temperature front in the bed employs four temperature transducers in each bed. One transducer T1 is flush with the top of the sorbent bed, and transducer T4 is in the middle of the bed. The remaining two transducers T2 and T3 are evenly spaced, intermediate these two sensors. The four transducers provide input to an analog circuit comprised of operational amplifiers and resistors. The outputs of the analog circuitry are as follows:

Output 1 is a voltage (positive or negative) that is proportional to $$T_2 - \frac{T_1 + T_3}{2}.$$

Output 2 is proportional to $$T_3 - \frac{T_2 + T_4}{2}.$$

A change in slope corresponding to the temperature front in the regions of transducers T2 and/or T3 is noted by comparing the temperatures of the two adjacent transducers. This system will show a negative output if a change in slope or hump is approaching or leaving the area in question.

These two voltage outputs can be compared to preset limits and used to drive simple logic gates to control the gas fractionator, or used in conjunction with a microprocessor control system.

One of the advantages of this system is that a continuous temperature gradient due to ambient heating or cooling will be cancelled out by the analog circuitry.

The gas fractionators of the invention can be used with any type of sorbent adapted to adsorb a first gas such as moisture from a second gas or gases. Activated carbon, alumina, silica gel, magnesia, various metal oxides, clays, fuller's earth, bone char, and Mobilbeads, and like moisture-adsorbing compounds can be used as the sorbent.

Molecular sieves can also be used; in many cases these have moisture-removing properties. This class of materials includes zeolites, both naturally-occurring and synthetic, the pores in which may vary in diameter from the order of several angstrom units to from 12 to 15 A. or more. Chabasite and analcite are representative natural zeolites that can be used. Synthetic zeolites that can be used include those described in U.S. Pat. Nos. 2,442,191 and 2,306,610. All of these materials are well known as desiccants, and detailed descriptions thereof will be found in the literature.

The gas fractionators described and shown in the drawings are all adapted for purge flow regeneration with the purge passing in counterflow to the gas influent. This, as is well known, is the most efficient way of utilizing a sorbent bed. As a gas passes through a sorbent bed in one direction, the first gas content of the sorbent progressively decreases, and normally the least amount of first gas will have been adsorbed at the outlet end of the bed. It is consequently only sound engineering practice to introduce the regenerating purge gas from the outlet end, so as to avoid driving first gas from the more saturated part of the bed into the less saturated part of the bed, and thus lengthen the regeneration cycle time required. If the purge flow be introduced at the outlet end, then the first gas present there, although it may be in a small amount, will be removed by the purge flow and brought towards the other end of the bed. Thus, the bed is progressively regenerated from the outlet end, and all the first gas is carried for the least possible distance through the bed before it emerges at the inlet end.

Nonetheless, for some purposes, it may be desirable to run the purge flow in the same direction as the influent flow. in accordance with the invention, it is possible to carry the first gas content of the sorbent to a very high level, much higher than is normally feasible, because of the protecting action of the temperature sensing element, which makes it possible to cut off flow at a time more precisely gauged to level of first gas than has heretofore been possible. Consequently, in many cases if the bed is brought nearly to the saturation point throughout, it will make little difference if the purge flow enters at the influent end or at the outlet end, and the invention contemplates both types of operation, although of course counterflow regeneration is preferred is most cases.

The apparatus illustrated in the drawings has from one to four temperature sensors per tank. Two, three or more sensors per tank will ensure operation despite failure of one or more sensors in the group. The sensors can be placed at different levels in the bed, so as to follow the passage of the temperature front progressively through the bed, in one direction during the adsorption cycle, and in the same or in the opposite direction during the regeneration cycle. As stated previously, as the adsorption cycle continues, the temperature front gradually moves from the inlet and towards the outlet end of the bed. Therefore, the passage of the front will of course actuate a sensor further from the outlet end sooner than a sensor nearer the outlet end. Two sensors spaced at a significant distance from each other will actuate at different times, and this fact can be used to actuate different states of the cycle, such as regeneration and repressurization, at different times.

Thus, for the regeneration cycle it is possible to employ one sensor at a point spaced a considerable distance from the outlet end of the bed, say, halfway down the bed, to detect the front at time A of the cycle, an actuate the cutting-off of the heaters in the bed being regenerated, for example, so that these are cut off early enough to ensure cooling of the bed to the regenerating cycle before it is put on the drying cycle. A second intermediate sensor can be used to actuate closing of the purge exhaust valves, and repressurize the regenerated bed. A third sensor at the far end of the bed may actuate the switching of the cycle switches, and terminate the drying cycle. In this case, of course, no timer is needed, and the regeneration cycle time is determined not by a timer but by the sensor.

The sensor within the sorbent bed can be at any depth within the diameter of the bed, but the distance from the outlet is dependent on the gas velocity and temperature which influence the rate of travel and the contour of the temperature front in the bed. Other factors discussed previously are first gas content of the influent gas and the content or level at which the sensor is actuated.

The precise location of the sensor in the bed is determined by one of two factors, the length of time to regenerate the bed, and the prevention of effluent breakthrough. Clearly, the sensor must be located and adjusted so that the sensor will sense the temperature front before the effluent first gas concentration becomes excessive, under most adverse conditions of influent flow rate and temperature. However, the sensor must also be located so that the amount of first gas required to saturate a bed sufficiently to actuate the sensing element can be desorbed in the regeneration time cycle provided. Thus, in a dryer where the regeneration time increases disproportionately with increased water content in the bed, such as a heatless type, a sensor will be moved closer to the inlet and the bed considered spent at a lower total dry gas content in the bed than in a heated dryer.

As stated previously, taking the above factors into consideration, the proper positioning of the sensor for detecting of the temperature front at the proper time for terminating an adsorption cycle under any given adsorption conditions can be determined empirically, obtaining and graphing data for the apparatus, as illustrated in FIGS. 1 to 4.

The following Examples in the opinion of the inventors represent a preferred method of operation of a dryer system in accordance with the invention:

EXAMPLE 1

A two bed heaterless dryer of the type shown in FIG. 5, having two desiccant beds each 50 inches long and 8.25 inches in diameter, containing activated alumina, was used to dry air at 90% relative humidity, at inlet temperatures of 100° F. to 70° F., and 90 psig inlet pressure. The superficial flow velocity of the air was 55 feet per minute. In each bed, a reference temperature sensor was installed at the mid bed position, and two temperature sensors, X and Y, actuatable at about 1.0° C. above the mid bed temperature, were placed in the bed, X at 12 inches and Y at 6 inches, from the outlet end of the bed, and one temperature sensor, Z, was placed at the outlet from the bed to detect breakthrough of the front from the bed.

Data for drying cycles at each 100° F. 90° F., 80° F. and 70° F. inlet temperature, each cycle being terminated when sensor Y was alarmed, is given in Table I:

TABLE I

| Cycle | FIG. 8 Curve | Inlet Temperature (°F.) | Time to Alarm, Min.[1] | | Effluent Dew Point °F. | | |
|---|---|---|---|---|---|---|---|
| | | | Sensor X | Sensor Y | At Start of run | At Time X Alarmed | At Time Y Alarmed |
| 1 | I | 100 | 3.8 | 4.5 | −56 | −54 | −52 |
| 2 | II | 90 | 3.8 | 4.6 | −60 | −58 | −56 |
| 3 | III | 80 | 3.9 | 4.7 | −65 | −59 | −60 |
| 4 | IV | 70 | 4.0 | 4.8 | −68 | −62 | −63 |

[1]Sensor Z was not alarmed in any of these cycles.

It is apparent from the data that the sensors X and Y each was alarmed at a time to terminate the drying cycle at a safe moisture level in the effluent gas, and that this was well before breakthrough of the front, since sensor Z was not alarmed. It is also clear from the different times of the cycles that the sensors made it possible to adjust cycle length to match variation in moisture level of the influent air, and thus preserve desiccant life by cutting down the number of regenerations materially.

The curves in FIG. 8 show the change in desiccant bed temperature °F. with drying time. In order to ensure delivery of effluent gas of the proper moisture level, had this dryer been on a timed cycle interval, it would have been necessary to set the cycle drying interval at 4.0 minutes, to prevent breakthrough at 100° F., as shown in Curve I, since if it has run beyond this, the heat of adsorption would have been carried out of the bed by the effluent gas. This would have meant that the dryer bed would have been reactivated prematurely in the case of Curves II, III and IV.

It is apparent that, as the moisture content of the influent air is reduced further, or if the influent flow rate is reduced, the cycle time will be extended accordingly. Cycle times as high as 60 minutes and more are possible.

EXAMPLE 2

A two bed heat-reactivated dryer of the type shown in FIG. 7, having two desiccant beds each 38 inches long and 12.4 inches in diameter, containing 142 lbs. of silica gel, was used to dry air at 40% relative humidity, 100° F. and 90 psig inlet pressure. The flow rate was 294 SCFM, equal to a superficial flow velocity of 52 feet per minute. Four temperature sensors, A, B, C, D, spaced six inches apart, as shown in Table II, were placed in each bed. One sensor, D, was placed at the outlet from the bed to detect breakthrough of the front from the bed. The sensors detected the progress of the temperature front from the inlet to the outlet of the bed, by measuring the temperature of the bed at each position. The temperature data obtained by each of sensors, A, B, C, D, at each position are graphed against time in curves I, II, III, IV respectively in FIG. 9. Effluent dew point was too low to be graphed, but effluent moisture in p.p.m. is given in Table III, against time to the end of the test. The test was ended when breakthrough of the front was apparent with use of effluent gas moisture content from 15 p.p.m. to 300 p.p.m.

TABLE II

| Sensor | Inches From Inlet |
|--------|-------------------|
| A | 20 |
| B | 26 |
| C | 32 |
| D | 38 |

TABLE III

| Elapsed Time, Hours:Min. | Effluent Gas Moisture Content (PPM) |
|--------------------------|-------------------------------------|
| 0:00 | 3.0 |
| 0:15 | 3.0 |
| 0:30 | 3.0 |
| 0:45 | 3.0 |
| 1:00 | 3.0 |
| 1:15 | 3.0 |
| 1:30 | 3.0 |
| 1:45 | 3.0 |
| 2:00 | 3.5 |
| 2:15 | 4.0 |
| 2:30 | 4.5 |
| 2:45 | 5.0 |
| 3:00 | 6.0 |
| 3:15 | 7.9 |
| 3:30 | 8.0 |
| 3:45 | 10.0 |
| 4:00 | 15.0 |
| 4:15 | 60.0 |
| 4:30 | 300.0 |

The effluent breakthrough point was reached when effluent gas moisture content exceeded 15 p.p.m. approximately four hours after the start of the test. It is apparent that Sensors A to C were actuated at a time early enough to prevent breakthrough, and that sensors can be used at any location in the bed to sense the arrival of the temperature front at that location. Thus, the cycle could have been terminated at any selected temperature at any selected location in the bed to ensure delivery of effluent gas of the desired moisture content.

While the invention has been described with principal emphasis on a desiccant dryer and a process for drying gases, it will be apparent to those skilled in the art that this apparatus with a suitable choice of sorbent can be used for the separation of one or more gaseous components from a gaseous mixture. In such a case, the adsorbed component can also be removed from the sorbent by application of heat, and optionally, in addition, a reduction in pressure, during regeneration. Thus, the process can be used for the separation of hydrogen from petroleum hydrocarbon streams and other gas mixtures containing the same, for the separation of oxygen from nitrogen, for the separation of olefins from saturated hydrocarbons, and the like. Those skilled in the art are aware of sorbents which can be used for these purposes.

In many cases, sorbents useful for the removal of moisture from air can also be used, preferentially to adsorb one or more gas components from a mixture thereof, such as activated carbon, glass wool, adsorbent cotton, metal oxides and clays such as attapulgite and bentonite, fuller's earth, bone char and natural and synthetic zeolites. The zeolites are particularly effective for the removal of nitrogen hydrogen and olefins, such as ethylene or propylene, from a mixture with propane and higher paraffin hydrocarbons, or butene or higher olefins. The selectivity of a zeolite is dependent upon the pore size of the material. The available literature shows the selective adsorptivity of the available zeolites, so that the selection of a material for a particular purpose is rather simple and forms no part of the instant invention.

In some cases, the sorbent can be used to separate a plurality of materials in a single pass. Activated alumina, for example, will adsorb both moisture vapor and carbon dioxide, in contrast to Mobilbeads which will adsorb only water vapor in such a mixture.

The apparatus employed for this purpose will be the same as that described and shown in FIGS. 5 and 7, and the process is also as described, suitably modified according to the proportions of the components to be separated, the operating pressure and temperature and the volume of available sorbent.

It will, however, be understood that the process is of particular application in the drying of gases, and that this is the preferred embodiment of the invention.

Having regard to the foregoing disclosure the following are claimed as the inventive and patentable embodiments thereof:

1. A process for reducing the concentration of a first gas in a mixture thereof with a second gas to below a limiting maximum concentration thereof in the second gas, which comprises passing the mixture in contact with and from one end to another end of bed of a sorbent having a preferential affinity for the first gas; adsorbing first gas thereon to form a gaseous effluent having a concentration thereof below the maximum, and forming a concentration gradient of first gas in the bed progressively decreasing from one end to the other end as the adsorption continues, and an increasing concentration of first gas in the second gas defining a concentration front progressively advancing in the bed from the one end to the other end as sorbent capacity therefor decreases; and forming a temperature front in the sorbent bed in which the temperature of the bed is changing, progressively increasing while adsorption of first gas in the bed continues, and then leveling off and progressively decreasing when adsorption of first gas in the bed ceases, thereby defining a change in slope of the temperature front; detecting the advance of the temperature front in the bed as the change in slope; and then, when the change in slope has reached a predetermined value corresponding to a selected degree of saturation of the bed with respect to first gas, discontinuing passing the gaseous mixture in contact with the bed before either the temperature front or the concentration front can leave the bed, and the limiting maximum concentration of first gas in the second gas can be exceeded.

2. A process according to claim 1 in which the first gas is water vapor and the sorbent is a desiccant.

3. A process in accordance with claim 1 which comprises desorbing first gas from the bed by passing a purge flow of gas low in concentration of said first gas in contact with the bed, and then repeating the adsorption and desorption cycles in sequence.

4. A process in accordance with claim 1 which comprises removing sorbed first gas from the bed at an elevated temperature sufficient to desorb said first gas.

5. A process in accordance with claim 1 which includes removing sorbed first gas from the bed at a pressure below the pressure at which adsorption is effected.

6. A process in accordance with claim 1 which includes removing sorbed first gas from the bed at a pressure below atmospheric.

7. A process in accordance with claim 1 in which the passing of the gaseous mixture in contact with the bed is discontinued automatically when the temperature front has traveled a predetermined distance through the bed.

8. A process in accordance with claim 1 which comprises employing two beds of sorbent, a first of which is on a cycle for adsorption of the first gas while the other of which is on a cycle for desorption of the first gas by a purge flow comprising effluent gas from the first bed.

9. A process in accordance with claim 8 wherein the bed on a desorption cycle is subjected to the purge flow at room temperature.

10. A process in accordance with claim 8 wherein the bed on a desorption cycle is subjected to the purge flow at an elevated temperature sufficient to aid in desorbing said water vapor.

11. A process in accordance with claim 8 wherein the bed on a desorption cycle is subjected to the purge flow at a pressure less than that for the adsorption cycle.

12. Apparatus for reducing the concentration of first gas in a mixture thereof with a second gas to below a limiting maximum concentration thereof in the second gas, comprising, in combination, a vessel; a chamber therein for a bed of sorbent having a preferential affinity for the first gas; a line for delivering influent gas at an inlet end of said bed; a line for delivering effluent gas from an outlet end of said bed; temperature sensing means in the bed in a position to sense the temperature thereof to detect the advance of the temperature front at a predetermined point sufficiently far from the end of the bed to prevent the leading edge of the temperature front from leaving the bed comprising at least two temperature transducers providing input to an analog circuit comprising operational amplifiers and resistors, one output of the analog circuit being a voltage that is proportional to $$T_2 - \frac{T_1 + T_3}{2},$$

and a second output being proportional to $$T_3 - \frac{T_2 + T_4}{2},$$

a change in slope corresponding to the temperature front at the transducers being shown by comparing the temperatures of the two transducers; means for giving a signal in response to the reaching of a predetermined temperature corresponding to a change in slope of the temperature front passing through the bed; and means for closing off the influent flow of gas in response to the signal.

13. Apparatus in accordance with claim 12, in which the two voltage outputs are compared to preset limits and used to drive simple logic gates to control the gas fractionator.

14. Apparatus in accordance with claim 12, in which the two voltage outputs are compared to preset limits and used in combination with a microprocessor.

* * * * *